J. BREWER.
MICROMETER.
APPLICATION FILED SEPT. 26, 1919.
1,432,664.
Patented Oct. 17, 1922.
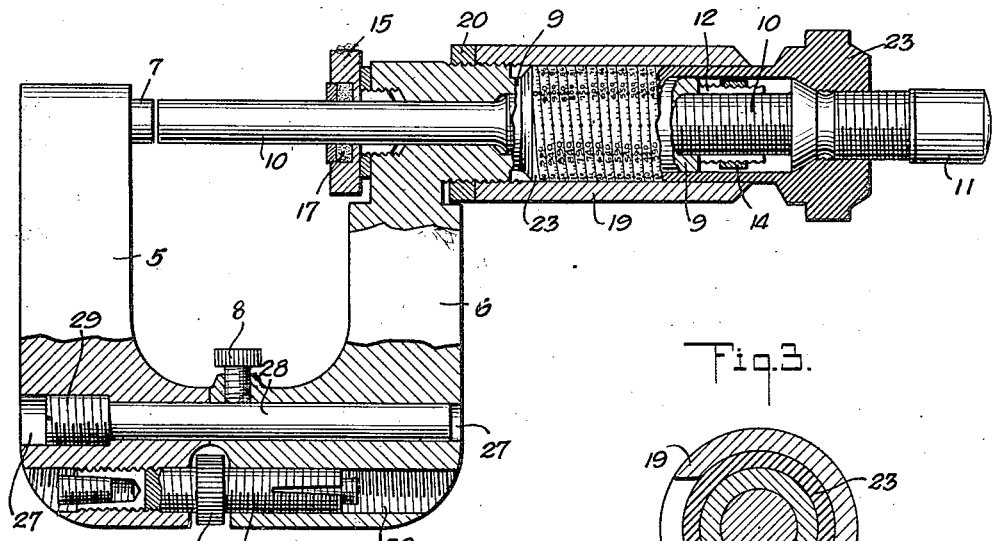
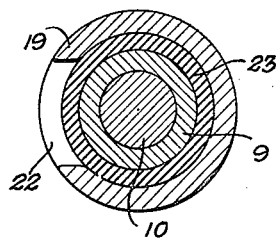
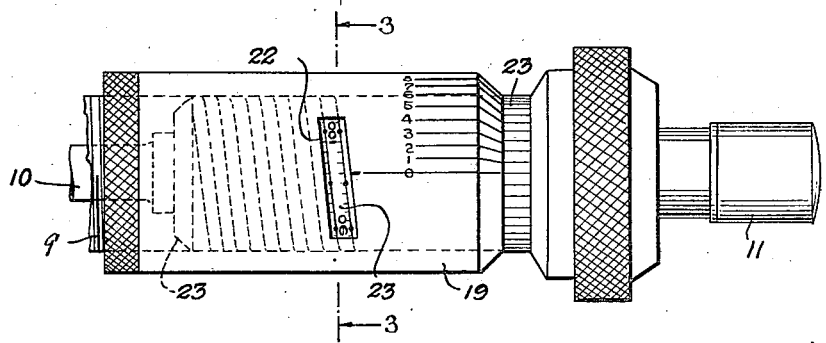
WITNESSES
Frederick Diehl.
J.C. Ledbetter
INVENTOR
JOSEPH BREWER
BY
ATTORNEYS Patented Oct. 17, 1922.

1,432,664

UNITED STATES PATENT OFFICE.

JOSEPH BREWER, OF NEW YORK, N. Y.

MICROMETER.

Application filed September 26, 1919. Serial No. 326,458.

*To all whom it may concern:*

Be it known that I, JOSEPH BREWER, a citizen of the United States, and a resident of the city of New York, borough of Bronx, county of Bronx, and State of New York, have invented a new and Improved Micrometer, of which the following is a full, clear, and exact description.

This invention relates to precision instruments, and more particularly to micrometers. The present disclosure presents what is known as a direct reading micrometer.

An object of the invention is to provide a precision instrument or micrometer which will directly display the reading in order to enable a mechanic or operator to scale off dimensions from bodies to be measured to obtain the dimension without making intermediate calculations.

It is an object to provide a micrometer with a window through which a graduated scale is readable to directly determine the precision measurement of a body interposed between the anvil and spindle of the micrometer.

I also have in view the object of providing a micrometer with an extensible frame. The frame is so designed and constructed as to enable the mechanic to expand or contract the frame in order to increase or decrease the capacity of the instrument to measure large and small bodies.

It is a further purpose to provide a micrometer which is simple in design, composed of a minimum number of parts, comparatively inexpensive to manufacture, and which is unlikely to get out of working order.

With the above and other principal objects in view, the invention has relation to the several micrometer designs as set forth in the several appended claims, and a preferred example and embodiment of which is described in the following specification and portrayed in the appended drawings, wherein:

Figure 1 illustrates the micrometer in side elevation but with the operating parts shown in section in order to disclose the movement of a graduated thimble.

Figure 2 illustrates an enlarged view of the portion removed from Figure 1 when a section was taken on Figure 1 to remove a part thereof to disclose interior parts. This Figure 2 shows the position of a window through which the direct reading is taken.

Figure 3 illustrates a sectional view taken on the line 3—3 of Figure 2 and discloses the relation of the several tubular or telescoped parts.

A direct reading precision instrument or micrometer built according to the plans of this invention comprises a frame having an anvil, said frame provided with an adjustably fixed outer shell. The outer shell has a window cut therein through which the direct readings are made. The frame is fitted with a rotating spindle as is usual in this class of instruments, and to the spindle is attached a thimble graduated in thousandths of an inch, or otherwise graduated to best suit the needs of the particular instrument to be constructed. The graduations of the rotatable thimble are directly read through the window of the outer shell. A barrel is integrally made with the frame of the micrometer and this barrel is internally threaded. The spindle is likewise threaded and screwed into the barrel. When the spindle is rotated it travels longitudinally in the barrel towards and away from the anvil carrying the graduated thimble with it to exhibit the direct readings of a measurement taken on a body interposed between the spindle end and the anvil.

In presenting a more detailed disclosure of the invention, and referring more in particular to the drawings, the numerals 5 and 6 designate the frame of the instrument, and the usual anvil 7 is provided on the frame part 5.

With the frame there is integrally made a barrel 9. This barrel is internally screw threaded to receive a threaded spindle 10. The spindle is provided with a ratchet turn knob 11 for delicately turning and adjusting the spindle. The barrel is provided on the outer end thereof with threaded split tubular sections 12, and a threaded nut is screwed on the tubular sections 12 to vary the tension of the barrel threads on the spindle threads. The nut 14 may be tightened or loosened to vary the pressure between the threaded spindle and threaded barrel in order to obtain a smoother and more accurate adjustment of parts. The spindle projects through the forward portion of the frame.

A nut 15 is provided with a packing material 17 which encompasses the spindle, and this nut is split to form a clamp shank on the threaded end, and when screwed into the frame, clamps the spindle and holds the set position of the micrometer. The packing washer 17 acts to clean dirt and grit off the spindle to prevent dirt from entering the threads, and thus obviating wear which occurs with present day micrometers where no means are provided to keep dirt and grit particles from the working parts.

An outer shell comprising a tubular member 19 is fixedly mounted on the frame by forming a screw threaded and locked juncture. A locking nut 20 may be employed to set the outer shell on the frame in a locked and immovable position. This outer shell is provided with a window 22 which is shown in Figures 2 and 3.

A graduated thimble 23 is fixed to the spindle by forming a screw threaded juncture therewith, or by other means more appropriate. In this instance the spindle is threaded on the back end thereof adjacent the ratchet knob and is screwed into the internally threaded head of the graduated thimble. In this manner the spindle and graduated thimble rotate in fixed relation one with the other. The thimble is tubular in form and closely fits within the internal bore of the outer shell 19. Likewise the internal bore of the tubular thimble closely fits on the barrel 9. As the thimble rotates it moves longitudinally along the outer shell 19 and barrel 9. The thimble is graduated in thousandths of an inch or is otherwise graduated to best suit the requirements of the particular instrument constructed according to the plans of this invention. One preferable method of graduating the thimble is to form a spiral line thereon starting at a predetermined point on the thimble and continuing through a concentric gradient until the other end of the spindle is reached. Thus the thimble displays a line in the form of a series of turns. This line is etched or marked on the steel surface of the thimble and is made to conform in pitch to the threads of the spindle and barrel. This causes an equality of movement to obtain with the spiral line, or the graduated barrel 23 and the spindle 10. The spiral line etched or cut on the graduated thimble should have a dot or mark periodically imprinted thereon, thus marking off the spiral line into a plurality of equal divisions. A number should be imprinted adjacent every other dot or division mark in order to indicate the number of divisions between that particular point on the graduated scale and the 0 mark at the bottom of the graduated thimble.

When the knob 11 is rotated the spindle 10 moves longitudinally in the frame approaching or receding from the anvil 7. Likewise the graduated thimble moves longitudinally with the frame in the outer shell relative to the window 22. This periodically displays the numbered graduated scale etched on the cylindrical surface of the thimble 23. Each number read through the window 22 indicates that many thousandths of the unit measurement, or of an inch, spaced off between the end of the spindle 10 and the anvil 7.

Observing Figure 2 it will be noted that the thimble knob 23 or ratchet 11 has been rotated until the 90 and 100 has moved into view under the window. An index mark is etched on the outer shell adjacent the window to act as a fixed point from which readings are taken. It is observed that the spiral line of the graduated thimble has stopped on the sixth gradient line of the scale which indicates that ninety-six thousandths is measured between the anvil and the spindle. By rotating the spindle four gradient points further it will be noted 100 will stand opposite the index mark which means that one hundred thousandths linear space is set out between the anvil and the spindle.

The outer shell may be adjusted relatively to the graduated thimble by loosening the lock ring 20 and slightly moving the shell until its index mark exactly coincides with the 0 mark of the thimble. This adjustment may be necessary at times due to wear through use of the instrument.

The anvil 7 may be provided with adjustment means for varying its depth in the frame 5 in order to correct errors in the instrument due to wear and use. This adjustment of the anvil 7 may be the same as is known to those skilled in the production of precision instruments. Likewise the ratchet knob 11 may be provided with some suitable and efficient form of ratcheting mechanism for allowing relative motion of the ratchet knob 11 and spindle 10 when said spindle has moved into engagement with the anvil 7.

The outer shell 19 may be provided with a conventional vernier scale as shown in Figure 2. The vernier scale comprises graduations marked off on the outer shell to correspondingly read with index marks made on the outer surface of the thimble. This vernier scale is provided on the micrometer according to the plans of vernier scales now in use on instruments built by presently known manufacturers and is used similar to the scale now used on precision instruments.

The above presentation embodies as a whole the direct reading feature of my micrometer, and a description of an extensible frame for varying the capacity of the instrument will now be given.

The micrometer frame as previously stated comprises the two parts 5 and 6. These framed parts are bored as designated at 27. A guide pin 28 is made with a smooth sliding surface and a screw threaded head 29. The head 29 is fixedly mounted in the frame part 5 while the frame part 6 is permitted to move in a relatively guided relation along the smooth pin 28. A clamp screw 8 is screw threaded into one of the frame parts to hold and clamp the frame and guide pin 28 in fixed relation after any extension adjustment has been made, and to hold the frame parts 5 and 6 in immovable relation when the micrometer is adjusted to its smallest measuring capacity.

A right and left handed extension screw 30 has centrally fixed thereon a knurled wheel 31. The left and right hand rotated screw 30 is rotatably mounted in a threaded bore 32 made in the frame part 5 and 6. The right and left hand screw should be provided with tension adjusters of the usual type in order to effect an adequate frictional engagement between the threaded parts. By rotating the knurled wheel 31 the frame parts 5 and 6 may be extended or retracted in order to increase or decrease the distance spaced off between the anvil and the spindle. In this way the capacity of measurement of the micrometer is increased. The frame of the instrument may be expanded one-quarter of an inch, one-half of an inch, or one inch and the mechanic will then add to this measurement by taking the precise measurement through the window 22 in order to read thousandths of an inch. The mechanic may further reduce the measurements and read down to one ten-thousandths of an inch by observing the vernier scale.

The invention and this direct reading micrometer is presented to fulfill the need felt for a precision instrument of this class.

Having thus described my invention, what I claim as new and desire to secure by Letters Patent is:

1. A micrometer, including an anvil, a frame for supporting said anvil, a spindle attached to said frame, and movable towards and away from said anvil, graduated means attached to said spindle for indicating the degree of longitudinal movement of the same, said frame including a pair of sections, each of said sections being formed with oppositely screw threaded aligning bores, an oppositely screw threaded rod having its ends projecting into said openings, whereby upon a rotation of said rod being effected the sections of said frame will be moved longitudinally of said rod, one with respect to the other.

2. A micrometer, including an anvil, a frame for supporting said anvil, a spindle attached to said frame, and movable towards and away from said anvil, graduated means attached to said spindle for indicating the degree of longitudinal movement of the same, said frame including a pair of sections formed with aligning bores, a guide pin secured to one of said sections and extending through both of said bores, and means for moving said frame sections lengthwise of said guide pin, one with respect to the other.

3. A micrometer, including an anvil, a frame for supporting said anvil, a spindle attached to said frame, and movable towards and away from said anvil, graduated means attached to said spindle for indicating the degree of longitudinal movement of the same, said frame including a pair of sections formed with aligning bores, a guide pin secured to one of said sections and extending through both of said bores, and means projecting into the bore of the second section of said frame for engaging said guide pin to prevent any relative movement of the frame sections one with respect to the other.

4. A micrometer, including an anvil, a barrel, said anvil being attached to said barrel, a threaded spindle movable within said barrel and extending beyond the same in line with said anvil, a tubular member having an opening secured to said barrel and encircling said spindle, a graduated thimble secured to said spindle and movable within said member, the graduations of said thimble being helixly arranged and in a pitch corresponding to the pitch of the threads of the spindle and are adapted to align with the opening formed in said tubular member, said barrel being formed with an inner tubular split end portion adapted to encircle the spindle, said spindle and barrel being formed with inter-engaging screw threads, and a nut encircling the split end sections of said barrel for permitting a varying of the engaging tensions between the screw thread of the barrel and spindle.

5. A micrometer, including an anvil, a barrel, a spindle, screw threads forming a part of said spindle and adapted to co-operate within said barrel to render said spindle longitudinally movable with respect thereto, the outer end of said spindle being adapted to co-operate with said anvil, a scale member fixed to said spindle and having graduations arranged in a helix of the same pitch as the threads of said spindle, and a member fixed to said barrel and having an index mark to cooperate with said graduations.

6. A micrometer including a barrel, a spindle longitudinally movable within said barrel, an anvil secured to said barrel, one end of said spindle being adapted to co-operate with said anvil, a clamping nut centered on said spindle and threadedly connected to said barrel, and a packing washer between said nut and said spindle.

JOSEPH BREWER.